(12) United States Patent
Nicolato et al.

(10) Patent No.: US 11,772,798 B2
(45) Date of Patent: Oct. 3, 2023

(54) AIRCRAFT MONUMENT WITH INTEGRATED CABIN CREW QUARTERS

(71) Applicant: B/E Aerospace, Inc., Winston-Salem, NC (US)

(72) Inventors: David D. Nicolato, Winston Salem, NC (US); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/666,044

(22) Filed: Feb. 7, 2022

(65) Prior Publication Data

US 2023/0249829 A1    Aug. 10, 2023

(51) Int. Cl.
*B64D 11/06* (2006.01)
*B64D 11/00* (2006.01)

(52) U.S. Cl.
CPC .. *B64D 11/0606* (2014.12); *B64D 2011/0076* (2013.01); *B64D 2011/0084* (2013.01)

(58) Field of Classification Search
CPC ........ B64D 11/0606; B64D 2011/0076; B64D 2011/0084
See application file for complete search history.

(56) References Cited

U.S. PATENT DOCUMENTS

| | | | |
|---|---|---|---|
| 6,073,883 A | 6/2000 | Ohlmann et al. | |
| 6,464,169 B1 | 10/2002 | Johnson et al. | |
| 6,520,451 B1 | 2/2003 | Moore | |
| 6,616,098 B2 | 9/2003 | Mills | |
| 7,083,145 B2 | 8/2006 | Mills | |
| 7,389,959 B2 * | 6/2008 | Mills | B64D 11/00 244/118.6 |
| 7,762,496 B2 | 7/2010 | Seiersen et al. | |
| 8,109,469 B2 | 2/2012 | Breuer et al. | |
| 8,136,762 B2 * | 3/2012 | Gauggel | B64D 11/00 244/118.6 |
| 8,152,102 B2 | 4/2012 | Warner et al. | |
| 8,256,712 B2 | 9/2012 | Sorensen | |
| 8,534,602 B2 * | 9/2013 | Jakubec | B64D 11/00 244/118.6 |
| 8,602,354 B2 | 12/2013 | Sutthoff et al. | |

(Continued)

FOREIGN PATENT DOCUMENTS

EP    3068665 B1    12/2020

*Primary Examiner* — Tye William Abell
(74) *Attorney, Agent, or Firm* — Suiter Swantz pc llo (57) ABSTRACT

The present disclosure provides an aircraft monument housing a crew quarters positionable in an aircraft cabin adjacent a longitudinal aisle, and a combination including a passenger suite and an aircraft monument housing a crew quarters. The aircraft monument includes a transverse wall forming part of the monument and separating interior space within the monument from the adjacent passenger suite. The interior space of the monument is divided by a shelf into upper and lower compartments and the crew quarters is positioned in the upper compartment for resting and sleeping use by the cabin crew. The lower compartment may be used by the cabin crew or for locating galley components. The transverse wall may be contoured such that the interior space and the passenger suite nest to maximize density. A footwell serving the passenger suite may be recessed into the transverse wall.

14 Claims, 10 Drawing Sheets

(56) References Cited

U.S. PATENT DOCUMENTS

| | | | | |
|---|---|---|---|---|
| 8,740,143 | B2* | 6/2014 | Helfrich | B64D 11/00 |
| | | | | 244/118.5 |
| 9,126,684 | B2 | 9/2015 | Warner et al. | |
| 9,308,995 | B2* | 4/2016 | Spellman | B64D 11/00 |
| 9,550,571 | B1* | 1/2017 | Ohlmann | B64D 11/00 |
| 11,167,850 | B2 | 11/2021 | McKee et al. | |
| 2006/0065783 | A1* | 3/2006 | Mills | B64D 11/00 |
| | | | | 244/118.6 |
| 2008/0302911 | A1* | 12/2008 | Warner | B64D 11/00 |
| | | | | 244/118.6 |
| 2010/0140402 | A1 | 6/2010 | Jakubec et al. | |
| 2011/0084165 | A1 | 4/2011 | Ulbrich-Gasparevic et al. | |
| 2014/0054417 | A1 | 2/2014 | Spellman et al. | |
| 2014/0298582 | A1* | 10/2014 | Kircher | B60P 3/38 |
| | | | | 5/9.1 |
| 2021/0269157 | A1* | 9/2021 | Schmidt-Schäffer | |
| | | | | B64D 11/0606 |

* cited by examiner

AIRCRAFT MONUMENT WITH INTEGRATED CABIN CREW QUARTERS

TECHNICAL FIELD AND BACKGROUND

The present disclosure relates generally to cabin crew quarters in an aircraft, and more particularly, to a resting and sleeping quarters for a cabin crew for a narrow-body aircraft positioned in a space-saving and weight-saving configuration occupying substantially otherwise unused space in an aircraft monument.

Wide-body aircraft have been the standard for long-haul passenger transport for decades due to their spacious interiors and ability to carry large, numbers of passengers. Recent advancements in aircraft capabilities, interior optimization; and weight savings, as well as environmental factors, have made narrow-body aircraft the preferred choice for long haul transport. For comparison; wide-body aircraft have a typical fuselage diameter of 5 m to 6 m and can accommodate more than 300 passengers, whereas narrow-body aircraft have a typical fuselage diameter of 3 m to 4 m and can accommodate up to about 300 passengers.

Aircraft flight length is defined in terms of the distance of a flight. Short-haul flights are typically less than about 800 nautical miles (nmi) and last anywhere from about 30 minutes to 3 hours. Medium-haul flights are typically from about 800 to 2,200 nmi and last anywhere from about 3 to 6 hours. Long-haul flights are typically more than 2,200 nmi and extend beyond about 6 hours, Different pilot and cabin crew requirements apply depending on the flight length.

Maximum flight times for pilots depend on the scheduled time of first flight and also the number of pilots. Long-haul flights require multiple pilots, for instance 2-4 pilots, that rotate shifts to cover the flight time, which in some instances can be more than 13 hours. The same restrictions apply to the cabin crew, where shifts are split to ensure that no individual works more than a predetermined number of hours in the cabin.

Between shifts, the pilots and cabin crew may retreat to a dedicated resting and sleeping quarters separate from the passengers. In wide-body aircraft, ample space is provided above, below, or otherwise positioned relative to the passenger cabin for locating the cabin crew quarters. In narrow-body aircraft, the relatively narrow fuselage requires that the cabin crew quarters be positioned with the passenger seating. In some cases, passenger seats may be reserved for use by the cabin crew. In other cases, the number of passenger seats may be reduced to accommodate a separate cabin crew quarters. In either case, a lesser number of passenger seats decreases revenue for the carrier.

Therefore, what is needed is a cabin configuration that maximizes the number of revenue-generating passenger seats while at the same time repurposing potentially empty space to accommodate cabin crew facilities.

SUMMARY OF THE INVENTIVE ASPECTS

To achieve the foregoing and other advantages, the inventive aspects disclosed herein are broadly directed to integrations of cabin crew resting and sleeping quarters in passenger cabin configurations for narrow-body aircraft. Solutions include, but are not limited to, repurposing potentially empty space in an aircraft monument positioned at one end of the passenger seating area to accommodate a cabin crew resting and sleeping quarters. Such solutions maximize the use of space in narrow-body aircraft, maximize the number of revenue-generating passenger seats, and provide a resting and sleeping quarters for the cabin crew separate from the passengers to meet mandated requirements, among other aspects and advantages.

In a first embodiment, the present disclosure provides an aircraft monument for positioning in an aircraft cabin adjacent an aircraft longitudinal aisle. The aircraft monument includes a first wall forming part of a passenger suite positionable adjacent the first wall, a second wall continuous with the first wall and positionable along the aircraft longitudinal aisle, and a horizontal shelf dividing an interior space of the aircraft monument into an upper compartment and a lower compartment. A crew quarters is positioned in the upper compartment such that a longitudinal axis of the crew quarters, and in some instances a bed longitudinal axis of a bed positioned in the crew quarters, is angled relative to the second wall. An entrance into the upper compartment is positioned on a side of the monument opposite the first wall, for instance accessible from a lateral aisle positioned at one end of a column passenger seats.

In some embodiments, the first wall is contoured, the upper compartment includes a first portion positioned near the second wall and a second portion positioned apart from the second wall, wherein the first and second portions are continuous, and wherein the second portion is longer than the first portion viewed in plan view, and the crew quarters and/or bed occupies a portion of each of the first and second portions, for instance the bed spans across the first and second portions.

In some embodiments, the aircraft monument further includes a footwell recessed into the first wall and extending into the lower compartment, wherein the horizontal shelf overhangs the footwell and the footwell is open to a side of the first wall opposite the entrance, for instance for use with a passenger seat positioned closest the first wall.

In some embodiments, a longest dimension of the upper compartment is provided along an axis oblique to the second wall, and the crew quarters longitudinal axis is parallel to the axis oblique to the second wall, or substantially parallel thereto.

In some embodiments, the aircraft monument further includes a third wall, continuous with the first wall, and oriented parallel to the second wall. In other embodiments, the third wall of the aircraft monument is the fuselage wall.

In some embodiments, the aircraft monument includes at least one of a door configured to close the entrance, a curtain configured to be drawn across the entrance, a step ladder coupled to the horizontal shelf, at least one step positioned in the lower compartment, and at least one galley cart stowed in the lower compartment. The lower compartment can be used by the aircraft crew, for storage, as a part of the galley, etc.

In another aspect, the present disclosure provides a combination assembly for positioning in a space in a passenger cabin of a narrow-body aircraft adjacent an aircraft longitudinal aisle. The combination includes an aircraft monument positionable in the space adjacent the aircraft longitudinal aisle, the aircraft monument including an interior space formed by a first wall extending across the space and a second wall, continuous with the first wall, positionable adjacent the aircraft longitudinal aisle. The combination further includes a passenger suite, or seating area, positioned to one side of the first wall and positionable adjacent the aircraft longitudinal aisle such that the passenger suite is directly accessible from the aircraft longitudinal aisle. A horizontal shelf positioned in the interior space divides the interior space into an upper compartment and a lower compartment. A crew quarters is positioned in the upper compartment and a passenger seat is positioned in the passenger suite. In some embodiments, the bed is positioned in the crew quarters configured to transition to a seat, and the passenger seat positioned in the suite may transition to a bed. Each of the bed longitudinal axis and the passenger seat longitudinal access is oblique to the aircraft longitudinal axis.

In some embodiments, the first wall is contoured and separates the interior space from the passenger suite, the upper compartment includes a first portion positioned near the second wall and a second portion positioned apart from the second wall, wherein the first and second portions are continuous, and the second portion is longer than the first portion in at least one dimension (i.e., front-to-back), and the bed occupies portions of each of the first and second portions.

In some embodiments, a portion of the first wall extends along one side of the passenger seat and the crew quarters is elevated relative to the passenger seat.

In some embodiments, a longest dimension of the upper compartment is provided along an axis oblique to the second wall such that bed is oriented at an angle to the aircraft longitudinal axis, wherein a foot end of the bed is positioned adjacent the aircraft longitudinal aisle or apart from the longitudinal aisle.

In some embodiments, a footwell is recessed into the first wall and extends into the lower compartment, wherein the horizontal shelf overhangs the footwell and the footwell opens toward the passenger seat positioned in the passenger suite.

In some embodiments, the aircraft monument includes at least one of a door configured to close the entrance, a curtain configured to be drawn across the entrance, a step ladder coupled to the horizontal shelf for climbing from the floor up to the upper compartment, at least one step positioned in the lower compartment, and at least one galley cart stowed in the lower compartment.

In some embodiments, the bed longitudinal axis and the passenger seat longitudinal axis are parallel, as well as additional passenger seats positioned in the same column as the aircraft monument.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to aircraft monuments including integrated cabin crew quarters. In some installation applications, the aircraft monument completes one end of a column of passenger seats, and an entrance into the interior space of the monument is from a lateral aisle that intersects an aircraft longitudinal aisle. In some embodiments, a portion of the monument interior space, for instance below the cabin crew quarters, provides stowage for galley equipment, galley carts, etc. Cabin configurations can include one or more dedicated cabin crew quarters depending on need. Passenger seating configurations, seat types and suite types compatible with the monument configurations discussed herein are not limited to any particular type, as many types of seats, suites and layouts benefit from the aircraft monument configurations discussed herein.

Figure 1:
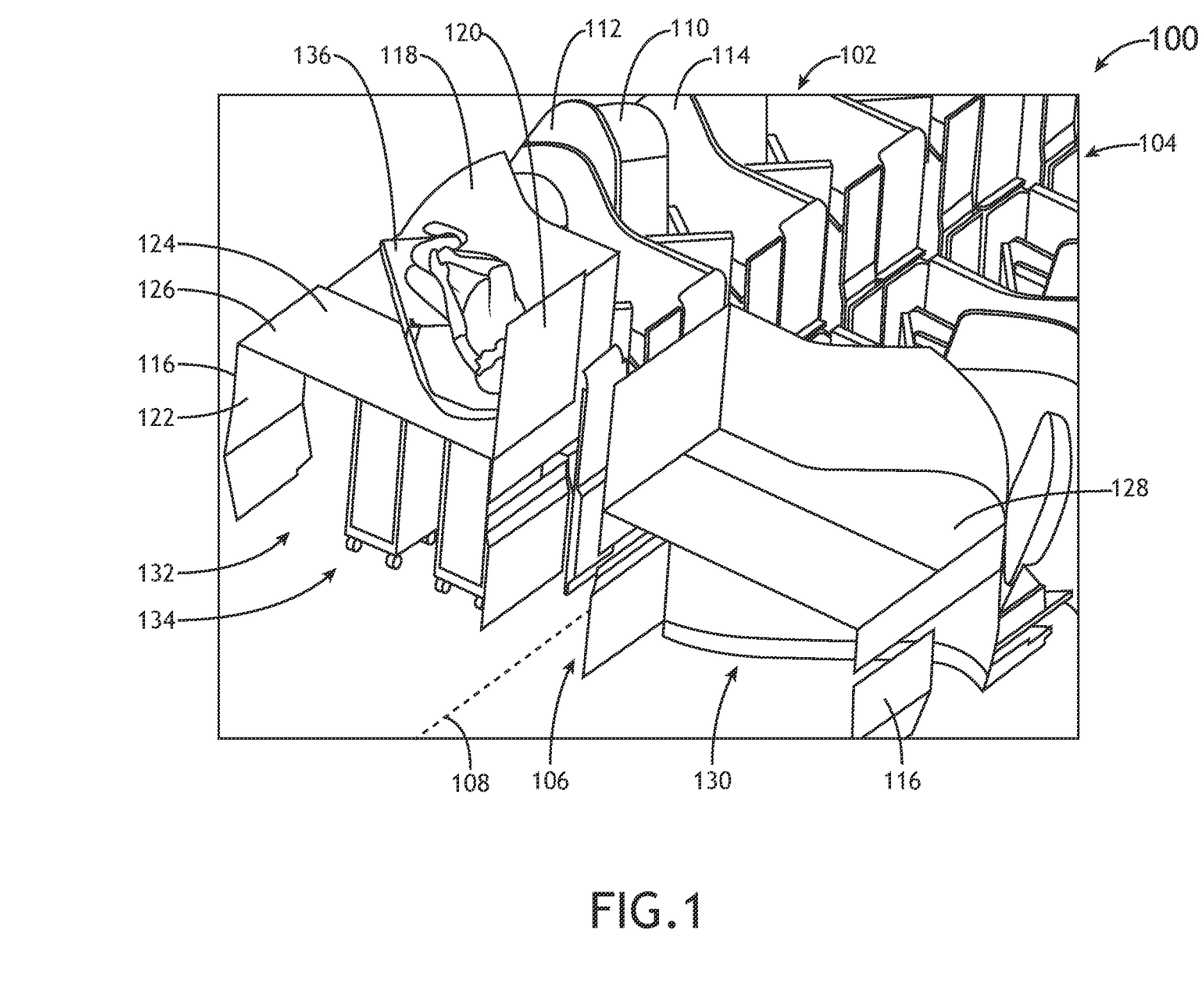
FIG. 1 is a front perspective view showing a portion of an aircraft cabin including aircraft monuments with integrated cabin crew quarters positioned at a forward end of each column of passenger seats.

Referring to FIG. 1, a non-limiting example of a layout 100 for a cabin of a narrow-body aircraft includes spaced first and second columns 102, 104 separated by an aircraft longitudinal aisle 106 parallel to the aircraft longitudinal axis 108. Each column 102, 104 includes a plurality of passenger seats 110 obliquely angled facing the aircraft longitudinal aisle 106. Each passenger seat 110 is positioned in its own dedicated passenger suite 112 providing privacy for each passenger. Passenger suites 112 are separated by privacy walls 114 that as shown are contoured, for instance generally sinusoidal-shaped, such that each suites nest in longitudinal alignment with its adjacent suite(s). Each privacy wall 114 may have the same shape such that the same privacy wall can be repeated along the length of its column.

An aircraft interior monument 116 according to the present disclosure is positioned at the end of each of the first and second columns 102, 104. The term "aircraft interior monument," also referred to herein simply as "monument," may be implemented as a bulkhead, galley compartment, closet, partition, furniture, etc. As shown, each monument 116 includes a first or transverse wall 118, a second wall 120, and in some embodiments a third wall 122 and in other embodiments the third wall may be the fuselage wall. The second wall 120 is continuous with the first wall 118 and the third wall is continuous with the first wall 118, when present. Continuous may mean integrally formed, coupled, or otherwise attached. The walls collectively define an interior space 124 within the monument 116. As shown, the first wall 118 spans across the width of its column 102, the second wall 120 extends along the aircraft longitudinal aisle 106, and the third wall 122 is parallel to the second wall 120.

A horizontal shelf 126 positioned in the interior space 124 divides the interior space into an upper compartment 128 positioned above the horizontal shelf and a lower compartment 130 positioned below the horizontal shelf. Each of the first, second and third walls 118, 120, 122 may extend from floor to ceiling to substantially enclose the interior space 124 on at least two sides, and preferably enclose the interior space on at least three sides. The entrance 132 into the upper compartment is from the side of the monument opposite the first wall 118. As shown in FIG. 1, the entrance 132 is through the "front" of the monument 116 and the front of the monument is directly accessible from an aircraft lateral aisle 134. In some embodiments, the aircraft lateral aisle 134 extends across the width of the aircraft cabin, for instance from exit door to exit door, and the same aisle is used to access both monuments 116. As such, the entrances into the monuments 116 are not visible to the passengers from their suites thereby concealing some movements of the cabin crew throughout the passenger cabin.

The lower compartment 130 of each monument 116 can be used for general stowage, galley cart stowage, locating cabinets or appliances, or for any other purpose. The upper compartment 128 is dimensioned to accommodate a bed 136, elevated relative to the passenger seats and oriented oblique to the aircraft longitudinal aisle 106 as discussed in detail below. In some embodiments, the first wall 118 is contoured, and the shape is the same or substantially similar in curvature to each of the successive privacy walls 114. As such, the aesthetic of the suite shapes is consistent throughout the cabin and the same passenger seat configuration can be used throughout the cabin, including the first passenger seat positioned directly adjacent the first wall 118.

Figure 2:
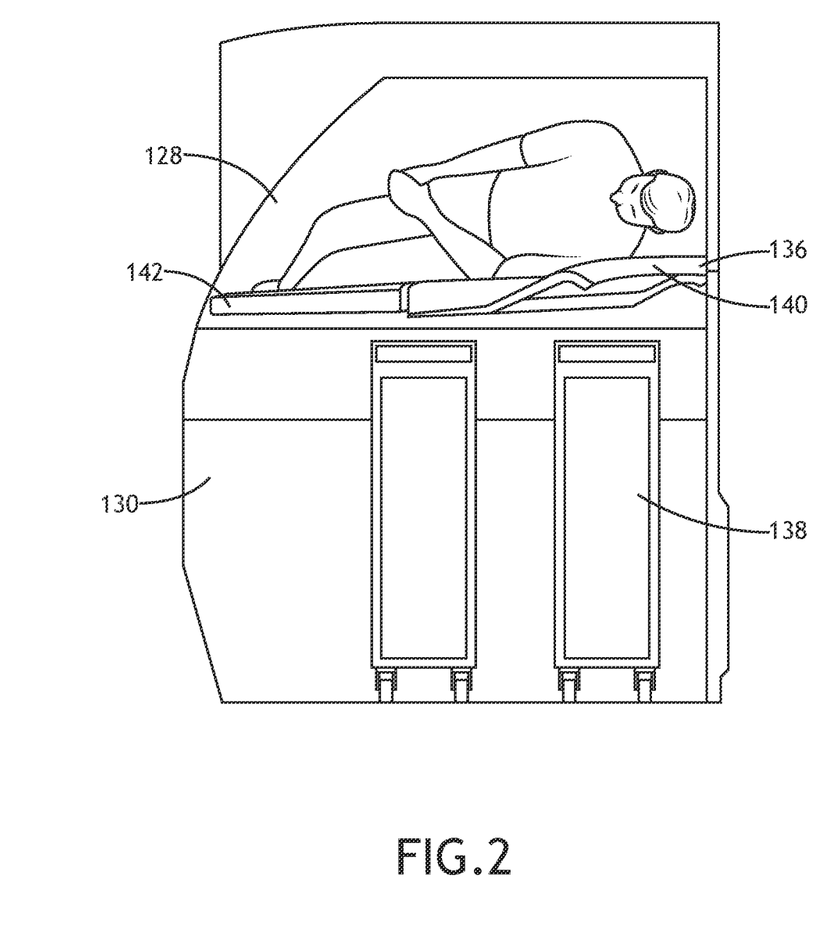
FIG. 2 is a front elevation view of an aircraft monument illustrating the division of the interior space into upper and lower compartments.

Referring to FIG. 2, the lower compartment 130 may be sized to accommodate galley carts 138 and the upper compartment 128 sized to accommodate the bed 136 and at least a comfortable sleeping position. In some embodiments, depending on available headroom in the upper compartment 128, the bed 136 may adjustable. For example, when enough headroom is available, the bed 136 may transition between a seat providing an upright sitting position and a lie-flat bed. For example, the bed 136 may be provided in two parts including a backrest 140 adjustable in recline relative to a seat bottom 142.

Figure 3A:
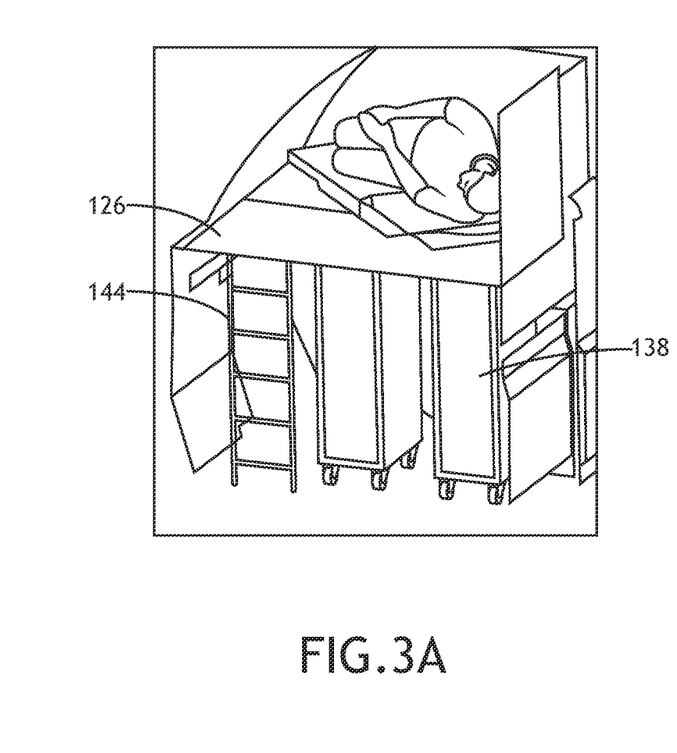
FIG. 3A is a front perspective view into the interior space showing a step ladder for accessing the cabin crew quarters.
Figure 3B:
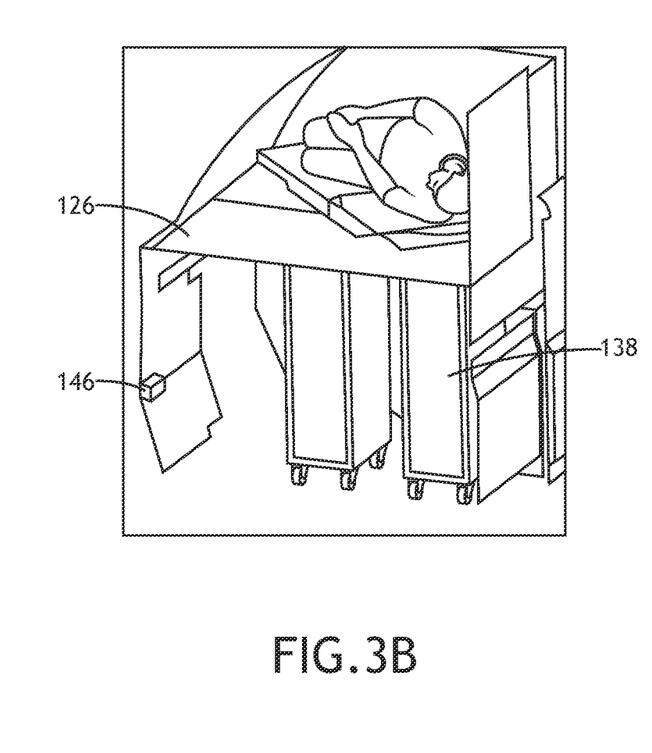
FIG. 3B is a front perspective view into the interior space showing at least one step for accessing the cabin crew quarters.

Referring to FIG. 3A, a step ladder 144 attaches to the horizontal shelf 126 to help the cabin crew gain access to the upper compartment. The step ladder 144 be detachable to stow elsewhere between uses and/or may slide along the length of the horizontal shelf 126 to be positioned out of the way to facilitating loading and unloading of the galley carts 138. Referring to FIG. 3B, instead of or in addition to a step ladder, at least one step 146, fixed or retractable, may be positioned within or just outside of the lower compartment to help gain access to the upper compartment.

Figure 4:
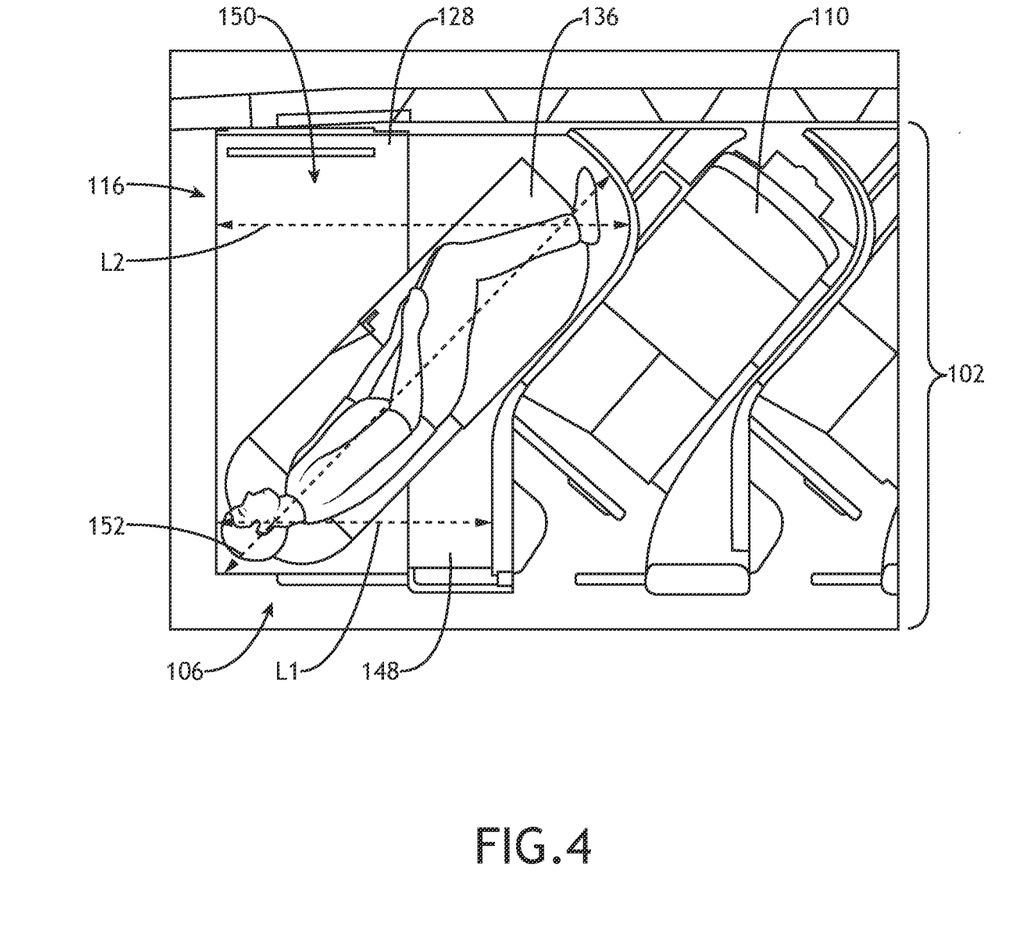
FIG. 4 is an overhead view of a portion of an aircraft cabin showing the bed orientation and position relative to a nearest passenger seat.

Referring to FIG. 4, the monument 116 is shown positioned at the forward end of an outboard seat column 102 adjacent to and in a nested configuration with the forwardmost passenger seat 110. The upper compartment 128 includes a first portion 148 positioned adjacent the aircraft longitudinal aisle 106 and a second portion 150 positioned apart from the aircraft longitudinal aisle 106. As shown, a length dimension L1 of the first portion 148 is shorter than a length dimension of the second portion 150 such that the entrance resides in a plane perpendicular to the aircraft longitudinal aisle 106, the second portion 150 extends rearward and along a portion of one side of the passenger seat 110, and a longest length of the upper compartment 128 is along an axis 152 oblique to the aircraft longitudinal aisle 106. As shown, the bed longitudinal axis is aligned along or parallel to the oblique axis 152. The orientation of the bed 136 as such within the upper compartment 128 allows for the maximum bed length, for instance up to about 190 cm (i.e., about 75 inches) as compared to a passenger bed length up to about 198 cm (i.e., about 78 inches). Open space positioned on opposing sides of the bed 136 may be used for cabin crew amenities, for instance, storage compartments, shelving, video equipment, power/data ports, light fixtures, etc.

Figure 5:
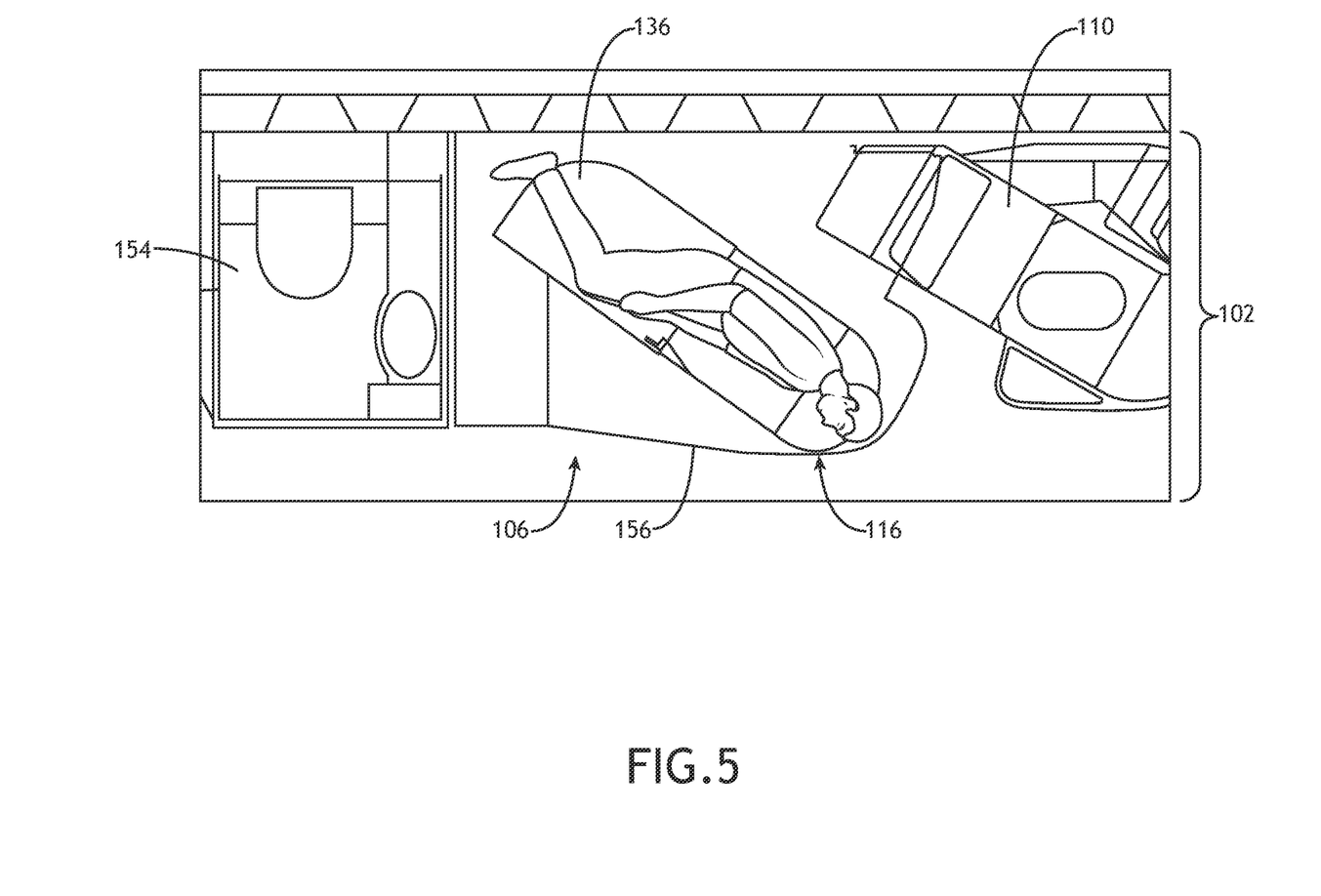
FIG. 5 is an overhead view of an outboard passenger seat column in an aircraft cabin showing an aircraft monument with integrated cabin crew quarters positioned between a passenger seat and a lavatory.

Referring to FIG. 5, another embodiment of the monument 116 may be positioned at a forward end of an outboard passenger seat column 102, for instance between the forwardmost passenger seat 110 and a lavatory 154. As shown, the passenger seat 110 and the bed 136 are angled relative to the aircraft longitudinal aisle and face away from the aircraft longitudinal aisle toward the fuselage wall. In this configuration, the entrance into the interior space housing the bed 136 is through a door 156 positioned on an inboard side of the monument for direct access into the interior space from the aircraft longitudinal aisle 106. Again, the bed longitudinal axis may be positioned parallel to the passenger seat longitudinal axis and open space to either side of the bed 136, which may be configured to transition into a seat, may be used to locate cabin crew amenities.

Figure 6:
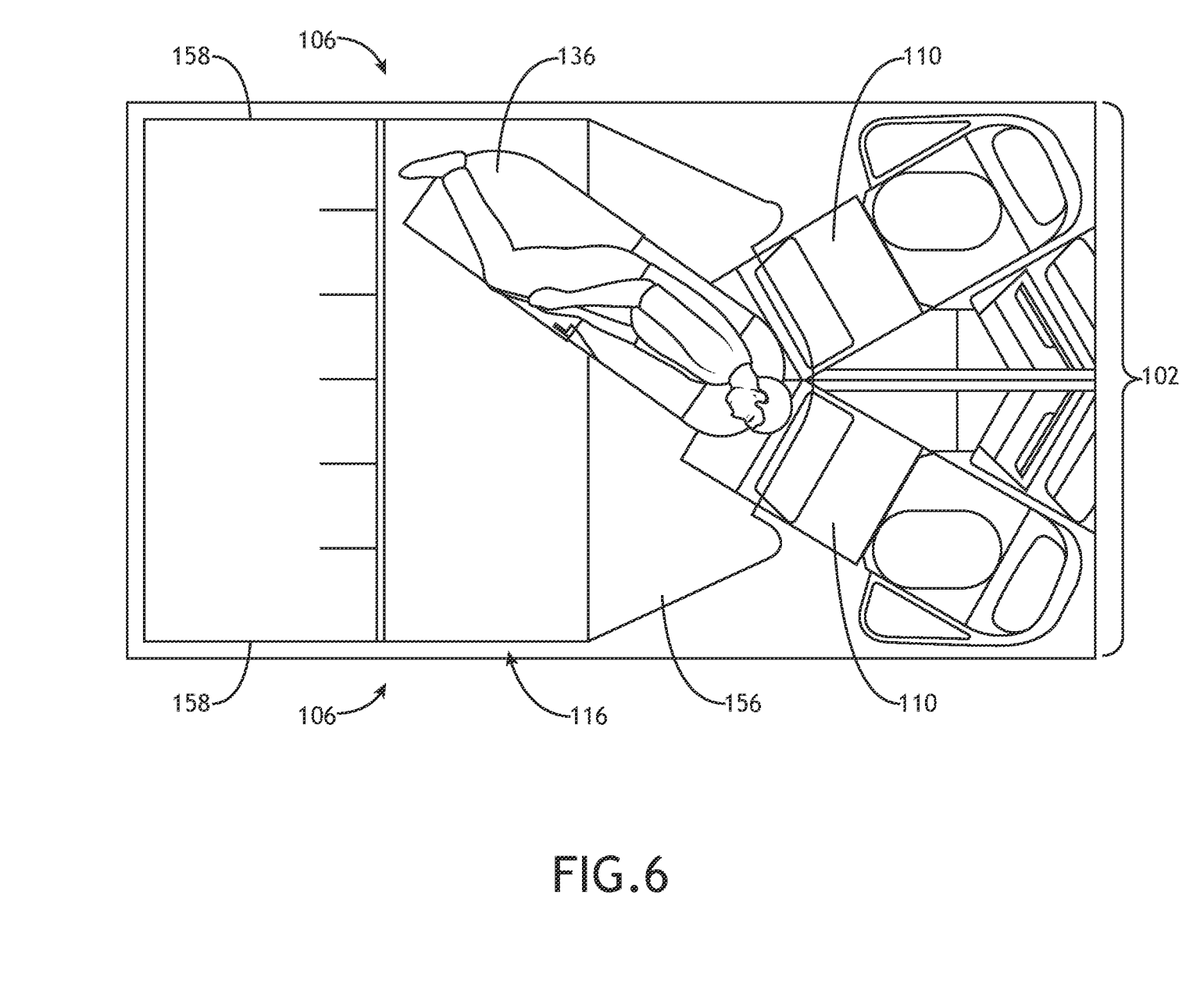
FIG. 6 is an overhead view of a portion of a center passenger seat column in an aircraft cabin showing an aircraft monument with integrated cabin crew quarters positioned at a forward end of the column.

Referring to FIG. 6, yet another embodiment of the monument 116 may be positioned at a forward end of a center passenger seat column 102 comprising pairs of passenger seats that converge in a direction of their foot end. In this configuration, the monument 116 widens as it extends away from the passenger seats 110 to a point at which the monument sidewalls 158 extend parallel to their adjacent aircraft longitudinal aisle 106. As shown, the upper compartment is sized to accommodate at least one bed 136. Although only bed 136 is shown with its bed longitudinal axis parallel to one of the passenger seat longitudinal axis, other configurations may include two beds positioning side-by-side and a center divider may divided the upper compartment into left and right upper compartments, longitudinal length permitting in the monument 116. One or more doors 156 positioned in one or more of the sidewalls 158 provides access into the interior space.

Figure 7:
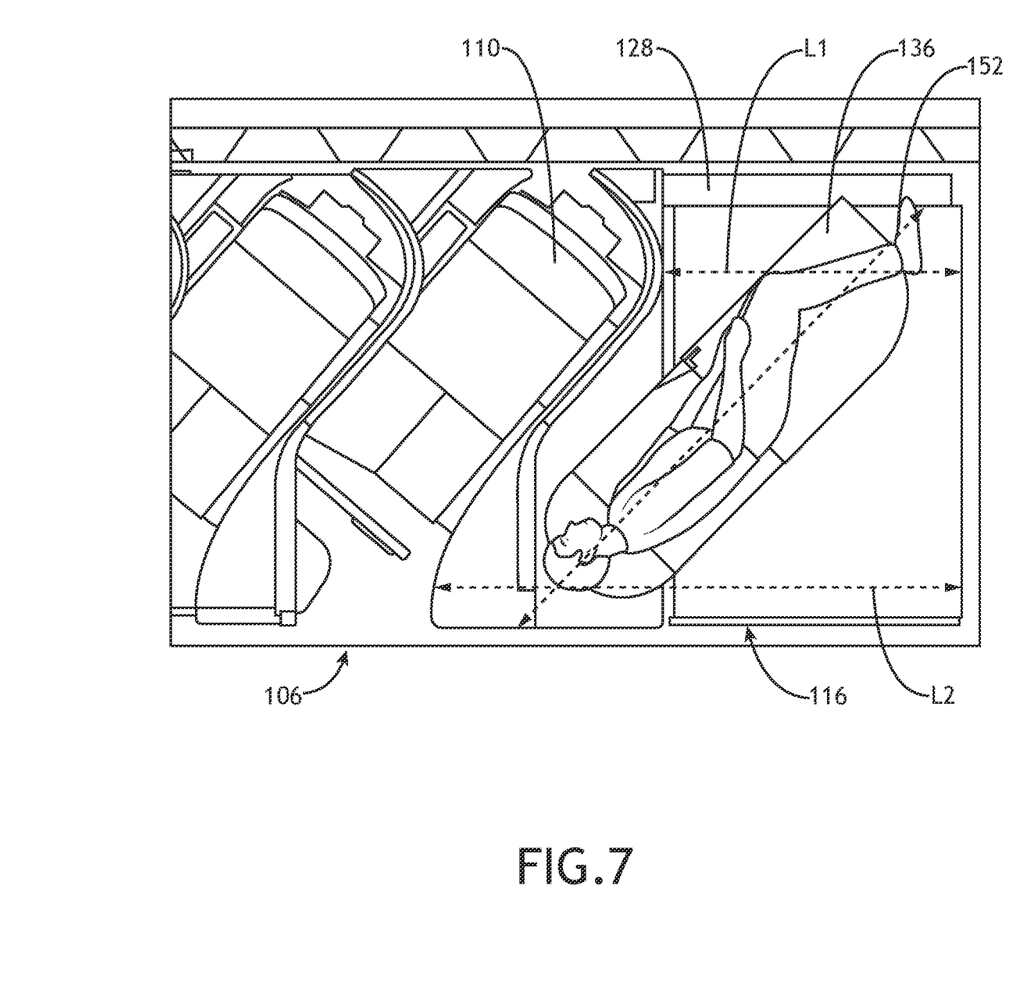
FIG. 7 is an overhead view of a portion of an outboard passenger seat column in an aircraft cabin showing an aircraft monument with integrated cabin crew quarters positioned at an aft end of the column.

Referring to FIG. 7, the monument 116 is shown positioned at the aft end of an outboard seat column 102 adjacent to and in a nested configuration with the aftmost passenger seat 110. Opposite the embodiment shown in FIG. 4, the upper compartment 128 includes a first portion positioned adjacent the aircraft longitudinal aisle 106 and having a length L2 and a second portion positioned apart from the aircraft longitudinal aisle 106 and having a length L1, wherein L2 is longer than L1 such that the longest dimension of the upper compartment for positioning the bed longitudinal axis 152 is oblique to the aircraft longitudinal axis 106. The bed longitudinal axis is parallel to each passenger seat longitudinal axis as the longest dimension of the interior space and each of the passenger suites is substantially the same.

Figure 8:
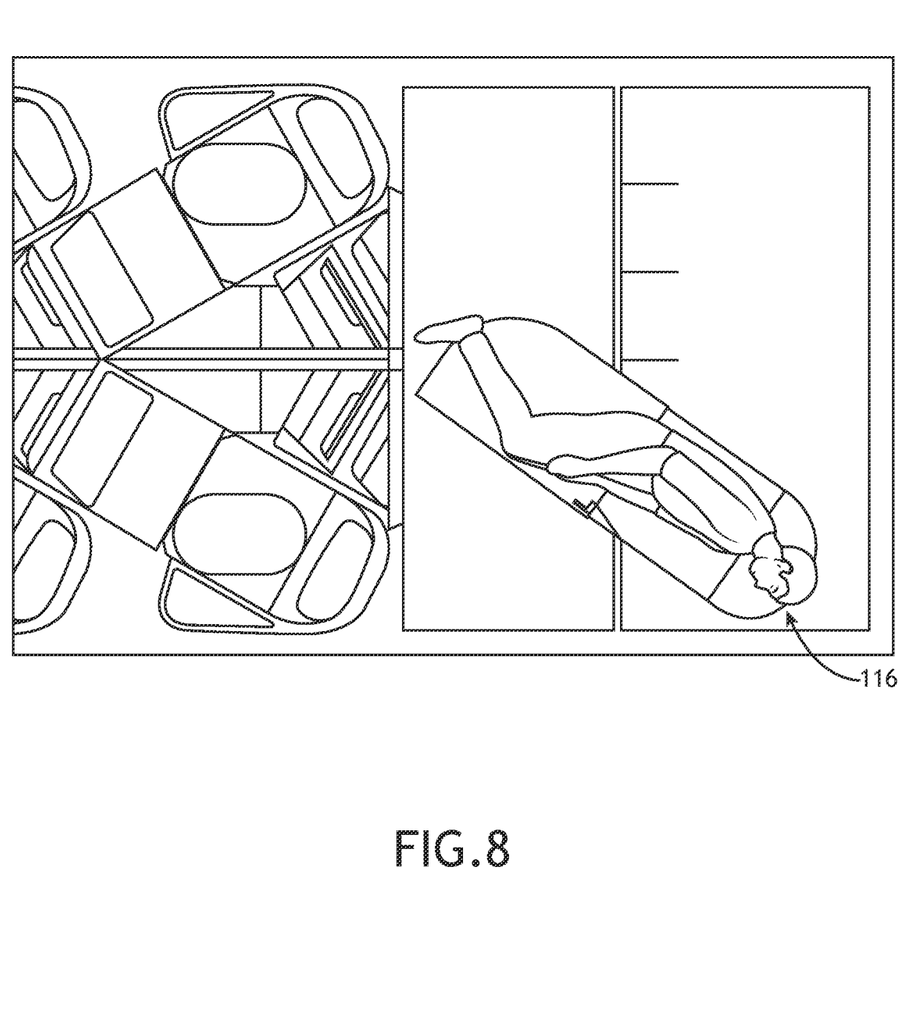
FIG. 8 is an overhead view of a portion of a center column in an aircraft cabin showing an aircraft monument positioned at the aft end of the column and with the bed longitudinal axis parallel to a passenger seat.
Figure 9:
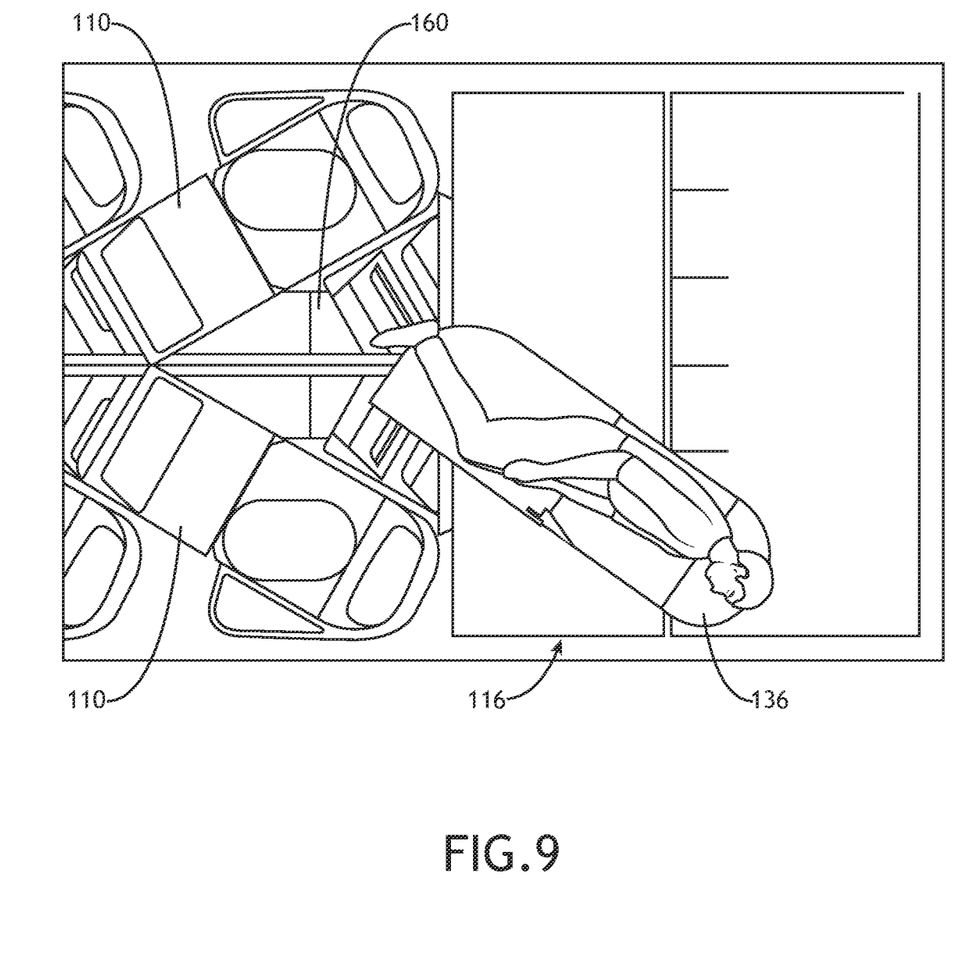
FIG. 9 is an overhead view of the center column shown in FIG. 8 and showing a portion of the cabin crew bed overhanging part of the center console formed between the nearest passenger seats.
Figure 10:
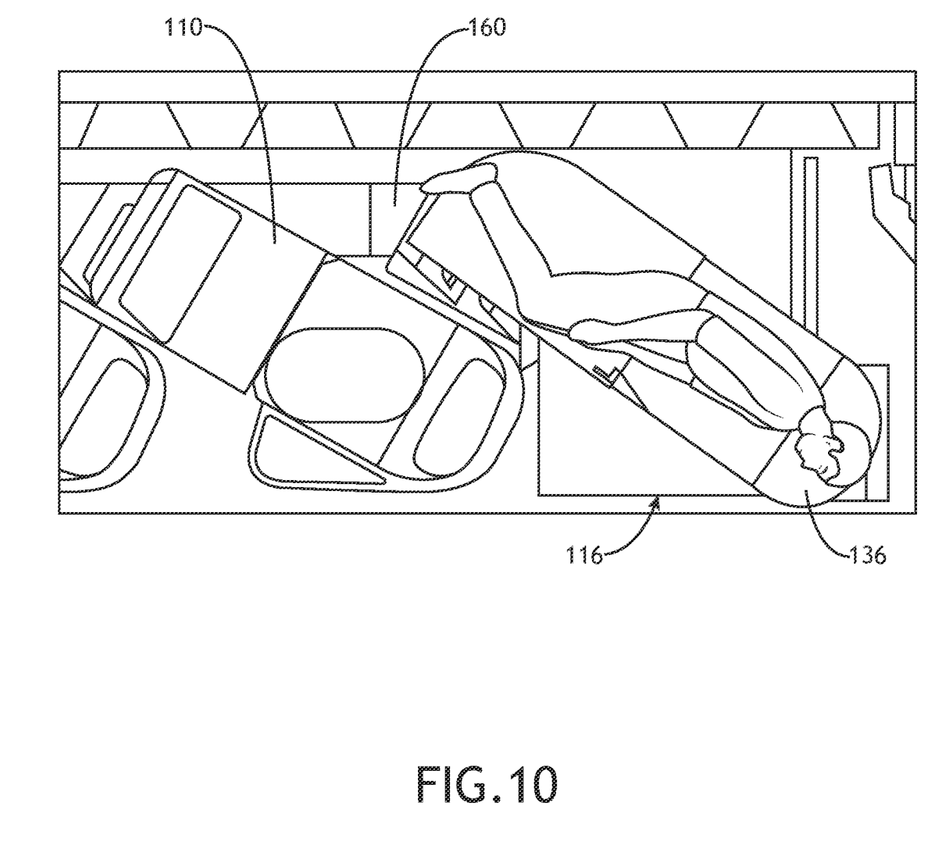
FIG. 10 is an overhead view of a portion of an outboard passenger seat column showing an aircraft monument positioned at an aft end of the column and with the bed parallel to an outboard facing passenger seat.

Referring to FIG. 8, yet another monument 116 configuration is shown (with similarities to the configuration shown in FIG. 6) but instead positioned at the diverging ends of the passenger seats. 110. Referring to FIG. 9, the monument 116 is configured substantially the same as the monument in FIG. 8, but the bed 136 is positioned with a portion thereof elevated directly above a portion of the center console 160 positioned between the laterally adjacent passenger seats 110. Such a configuration further maximizes density of elements positioned along the aircraft longitudinal axis. Like the embodiment shown in FIG. 9, the embodiment shown in FIG. 10 positions the monument 116 at the aft end of the column and the bed 136 overhanging part of the passenger seat outboard console 162. Because the upper compartment in the monument us elevated as compared to the passenger seat height, the extension of the bed over part of the console does not interfere with use of the console.

As stated above, an aircraft cabin may be equipped with at least one monument or combination monument and passenger suite depending on the cabin configuration, and particularly the suite configuration, passenger suite configuration, space available at either end of the seat columns, etc.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An aircraft monument for positioning in an aircraft cabin laterally adjacent to an aircraft longitudinal aisle, comprising:
   a first wall forming part of a passenger suite positionable adjacent the first wall;
   a second wall, continuous with the first wall, positionable adjacent the aircraft longitudinal aisle, and the second wall defining a lateral extent of the aircraft monument;
   a horizontal shelf dividing an interior space of the aircraft monument into an upper compartment and a lower compartment; and
   a crew quarters positioned in the upper compartment, the crew quarters having a longitudinal axis angled oblique relative to the second wall;
   wherein an entrance into the upper compartment is positioned on a side of the monument opposite the first wall;
   wherein a vertical plane of the first wall is curved; and
   wherein the upper compartment comprises a first portion positioned adjacent to the second wall and a second portion positioned adjacent to the first portion, wherein the second portion is longer than the first portion as viewed in a plan view.

2. The aircraft monument according to claim 1, wherein a portion of the horizontal shelf overhangs a footwell of an adjacent passenger seat.

3. The aircraft monument according to claim 1, wherein:
   a longest dimension of the upper compartment of the interior space is provided along an axis oblique to the second wall;
   a bed is positioned in the crew quarters; and
   a bed longitudinal axis is parallel to the axis oblique to the second wall.

4. The aircraft monument according to claim 1, further comprising a third wall, continuous with the first wall, and oriented parallel to the second wall.

5. The aircraft monument according to claim 1, further comprising at least one of:
   a door configured to close the entrance;
   a curtain configured to be drawn across the entrance;
   a step ladder coupled to the horizontal shelf; and
   at least one step positioned in the lower compartment.

6. The aircraft monument according to claim 1, further comprising at least one galley cart stowed in the lower compartment.

7. A combination assembly for positioning in a space in a passenger cabin of a narrow-body aircraft laterally adjacent to an aircraft longitudinal aisle, comprising:
   an aircraft monument positionable in the space laterally adjacent to the aircraft longitudinal aisle, the aircraft monument including an interior space formed by a first wall extending across the space and a second wall, continuous with the first wall, positionable adjacent the aircraft longitudinal aisle, wherein a vertical plane of the first wall is curved and the second wall defines a lateral extent of the aircraft monument;

a passenger suite positioned to one side of the first wall and positionable adjacent the aircraft longitudinal aisle such that the passenger suite is directly accessible from the aircraft longitudinal aisle;

a horizontal shelf positioned in the interior space of the aircraft monument dividing the interior space into an upper compartment and a lower compartment; and a crew quarters positioned in the upper compartment of the interior space; and a passenger seat positioned in the passenger suite;

wherein each of a longitudinal axis of the crew quarters and a passenger seat longitudinal access is oblique to the aircraft longitudinal axis; and wherein an entrance into the upper compartment is positioned on a side of the aircraft monument opposite the passenger suite.

8. The combination assembly according to claim 7, wherein a longest dimension of the upper compartment of the interior space is provided along an axis oblique to the second wall.

9. The combination assembly according to claim 7, wherein a portion of the horizontal shelf overhangs a footwell that opens toward the passenger seat positioned in the passenger suite.

10. The combination assembly according to claim 7, further comprising a third wall, continuous with the first wall, and oriented parallel to the second wall.

11. The combination assembly according to claim 7, further comprising at least one of:

a door configured to close the entrance;
a curtain configured to be drawn across the entrance;
a step ladder coupled to the horizontal shelf;
at least one step positioned in the lower compartment; and
at least one galley cart stowed in the lower compartment.

12. The combination assembly according to claim 7, wherein:

the first wall is contoured and separates the interior space from the passenger suite;

the first wall incorporates at least one amenity serving the passenger suite;

the upper compartment includes a first portion positioned adjacent to the second wall and a second portion positioned adjacent to the first portion, wherein the second portion is longer than the first portion when viewed in a plan view; and the crew quarters spans portions of each of the first and second portions.

13. The combination assembly according to claim 12, wherein the second portion of the upper compartment extends along one side of the passenger seat and includes a bed elevated relative to the passenger seat.

14. The combination assembly according to claim 12, further comprising a bed positioned in the crew quarters, wherein a bed longitudinal axis and the passenger seat longitudinal axis are parallel, and wherein the bed spans across a portion of each of the first and second portions of the upper compartment.

* * * * *